(12) United States Patent
Grover et al.

(10) Patent No.: US 9,718,228 B1
(45) Date of Patent: Aug. 1, 2017

(54) MOLD AND METHOD OF MAKING A MOLD

(71) Applicant: Cambridge Security Seals LLC, Pomona, NY (US)

(72) Inventors: Gurmeet Grover, Oakland, NJ (US); Michael Gizzarelli, Newburgh, NY (US); Elisha Tropper, Scarsdale, NY (US)

( * ) Notice: Subject to any disclaimer, the term of this patent is extended or adjusted under 35 U.S.C. 154(b) by 60 days.

(21) Appl. No.: 14/851,202

(22) Filed: Sep. 11, 2015

Related U.S. Application Data

(60) Provisional application No. 62/050,841, filed on Sep. 16, 2014.

(51) Int. Cl.
| | |
|---|---|
| *B29C 33/30* | (2006.01) |
| *B29C 45/26* | (2006.01) |
| *B29C 33/20* | (2006.01) |
| *B29C 33/44* | (2006.01) |
| *B29C 45/17* | (2006.01) |
| *B29C 45/37* | (2006.01) |
| *B29C 45/40* | (2006.01) |
| *B29C 45/73* | (2006.01) |

(52) U.S. Cl.
CPC .......... *B29C 45/2673* (2013.01); *B29C 33/20* (2013.01); *B29C 33/301* (2013.01); *B29C 33/302* (2013.01); *B29C 33/442* (2013.01); *B29C 45/1756* (2013.01); *B29C 45/376* (2013.01); *B29C 45/401* (2013.01); *B29C 45/73* (2013.01); *B29C 2045/2683* (2013.01); *B29C 2045/378* (2013.01)

(58) Field of Classification Search
CPC ... B29C 33/301; B29C 33/302; B29C 33/442; B29C 45/26; B29C 45/37; B29C 45/401; B29C 2045/378
See application file for complete search history.

(56) References Cited

U.S. PATENT DOCUMENTS

| | | | | |
|---|---|---|---|---|
| 1,897,023 | A * | 2/1933 | Schirmer | B29C 33/301 100/295 |
| 1,897,893 | A * | 2/1933 | Evans | B29C 33/301 249/103 |
| 2,679,172 | A * | 5/1954 | Clevenger | B21D 37/20 72/362 |
| 2,924,851 | A * | 2/1960 | Birckhead, Jr. | B29C 33/302 249/141 |
| 5,702,731 | A * | 12/1997 | Hayakawa | B29C 33/0066 249/107 |

(Continued)

*Primary Examiner* — James Mackey

(57) ABSTRACT

A mold for the manufacture of plastic objects has a plurality of cavities which are formed by clamping together a plurality of individual insert straps. The insert straps each have a shape corresponding to a portion of the desired cavity and the insert straps in combination form the desired cavity The insert straps may be rearranged and straps may be added or withdrawn to provide cavities of different lengths and configurations. The mold also has a sub-ejector assembly which may be positioned to accommodate changes in the size of the individual cavities formed by the combination of insert straps The method for making a mold includes the steps of forming a mold cavity using a plurality of insert straps and then clamping the individual insert straps together.

11 Claims, 28 Drawing Sheets

(56) References Cited

U.S. PATENT DOCUMENTS

| | | | |
|---|---|---|---|
| 7,503,093 B2* | 3/2009 | Weihrauch | A46B 3/22 15/167.1 |
| 2006/0055085 A1* | 3/2006 | Nakagawa | B29C 45/73 264/328.16 |
| 2012/0041337 A1* | 2/2012 | Ferguson | A61M 37/0015 600/573 |

* cited by examiner

MOLD AND METHOD OF MAKING A MOLD

The present application claims priority from Provisional Patent Application, titled Mold and Method of Making a Mold, Ser. No. 62/050,841, filed on Sep. 16, 2014.

FIELD OF THE INVENTION

The present invention relates generally to the field of molds for high speed molding of products and more particularly to a mold for molding of products having a range of configurations.

BACKGROUND OF THE INVENTION

The construction and use of injection molds for high speed molding of plastic, rubber and similar materials is well known. Typically, production injection molds have two carefully aligned portions which have the negative geometry of the desired product. Production injection molds usually have a plurality of cavities. During the operation cycle, raw material is injected under pressure and simultaneously into each of the plurality of cavities and the injection mold is subjected to a pre-established thermal cycle. The thermal cycle transforms the raw material into a solid state having the desired geometric configuration of the manufactured product. The mold then opens, separating the two aligned portions and injector pins push or eject the molded product from the injection mold for further processing.

Prior art injection molds are typically configured to manufacture a single product configuration. When a different shaped product is desired or a similar product of a different size is required, a different injection mold must be fabricated.

The fabrication of injection molds requires close tolerance precision machining which is both time consuming and expensive.

OBJECTS AND SUMMARY OF THE INVENTION

It is an object of the present invention to provide a mold which can be quickly modified by a user to produce products of different configurations.

Another object of the invention is to provide a mold which can easily produce products of different lengths.

Additional objects and advantages of the present invention will be made clear hereinafter.

In accordance with the present invention there is provided a mold which overcomes the disadvantages of the prior art by providing a plurality of individual cavities each of which is adapted for injection molding of a plastic part. Each of the cavities is formed by clamping together a plurality of insert straps. The insert straps may be rearranged to provide individual mold cavities of different lengths. The mold also features a sub-ejector assembly, the position of which can be adjusted to accommodate changes in the length of the mold cavities.

The present invention overcomes the disadvantages of the prior art by providing a method for modifying injection molds which enables a user to quickly modify an injection mold to enable the injection mold to produce products of different lengths or different geometries.

The method according to the present invention comprises the following steps.

1. Providing an injection mold having a plurality of cavity insert bars each of which has a portion of a desired mold cavity.
2. Forming a complete mold cavity extending across a plurality of the cavity insert bars.
3. Clamping the cavity insert bars together within an injection mold body to form a rigid unit.
4. Adjusting the size of the mold cavity by adjusting the number of cavity insert bars selected to form a complete mold cavity of a different configuration.

BRIEF DESCRIPTION OF THE DRAWINGS

Additional details of construction of the present invention will be described with reference to the drawings in which.

DETAILED DESCRIPTION OF THE INVENTION

Figure 1:
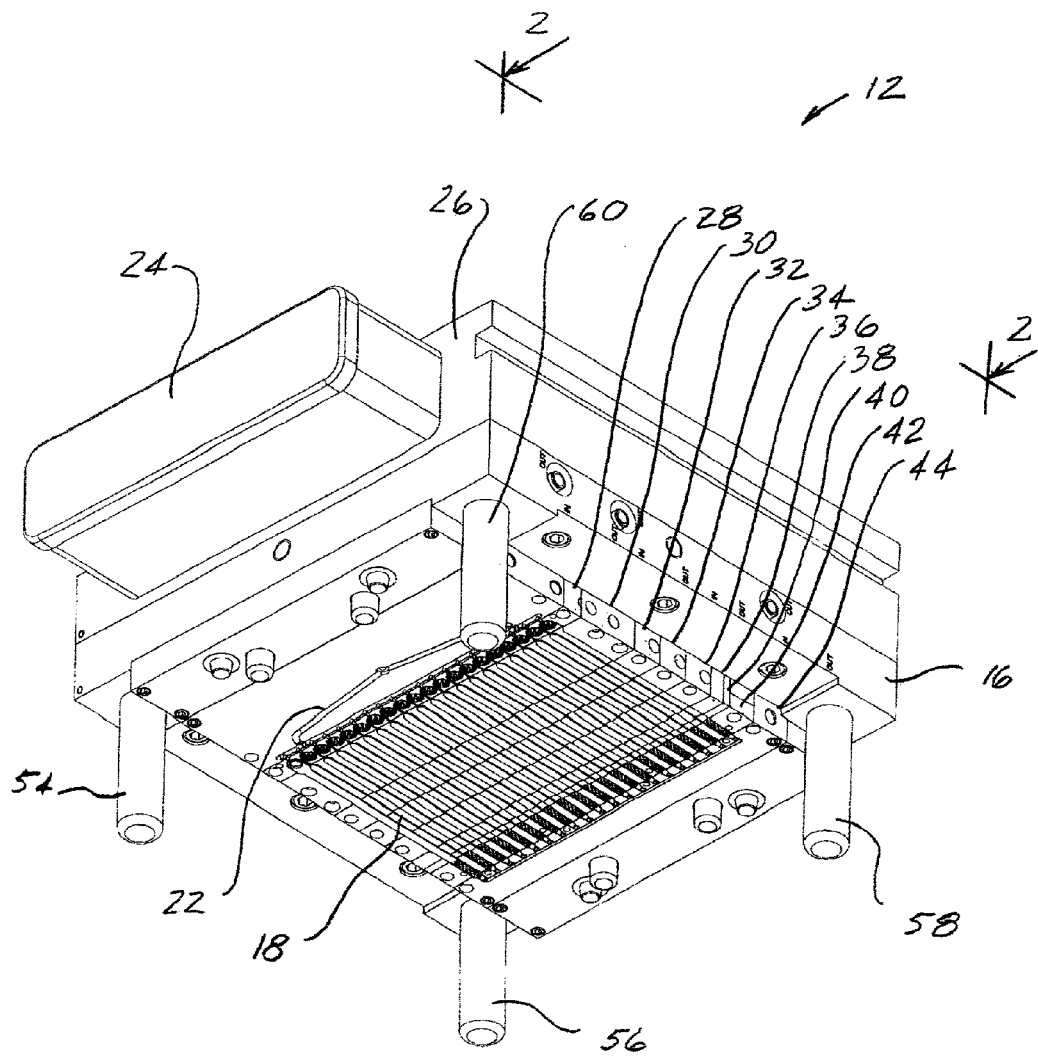
FIG. 1 is an overall perspective view of the injection half or "A" side of a mold made according to the present invention.
Figure 19:
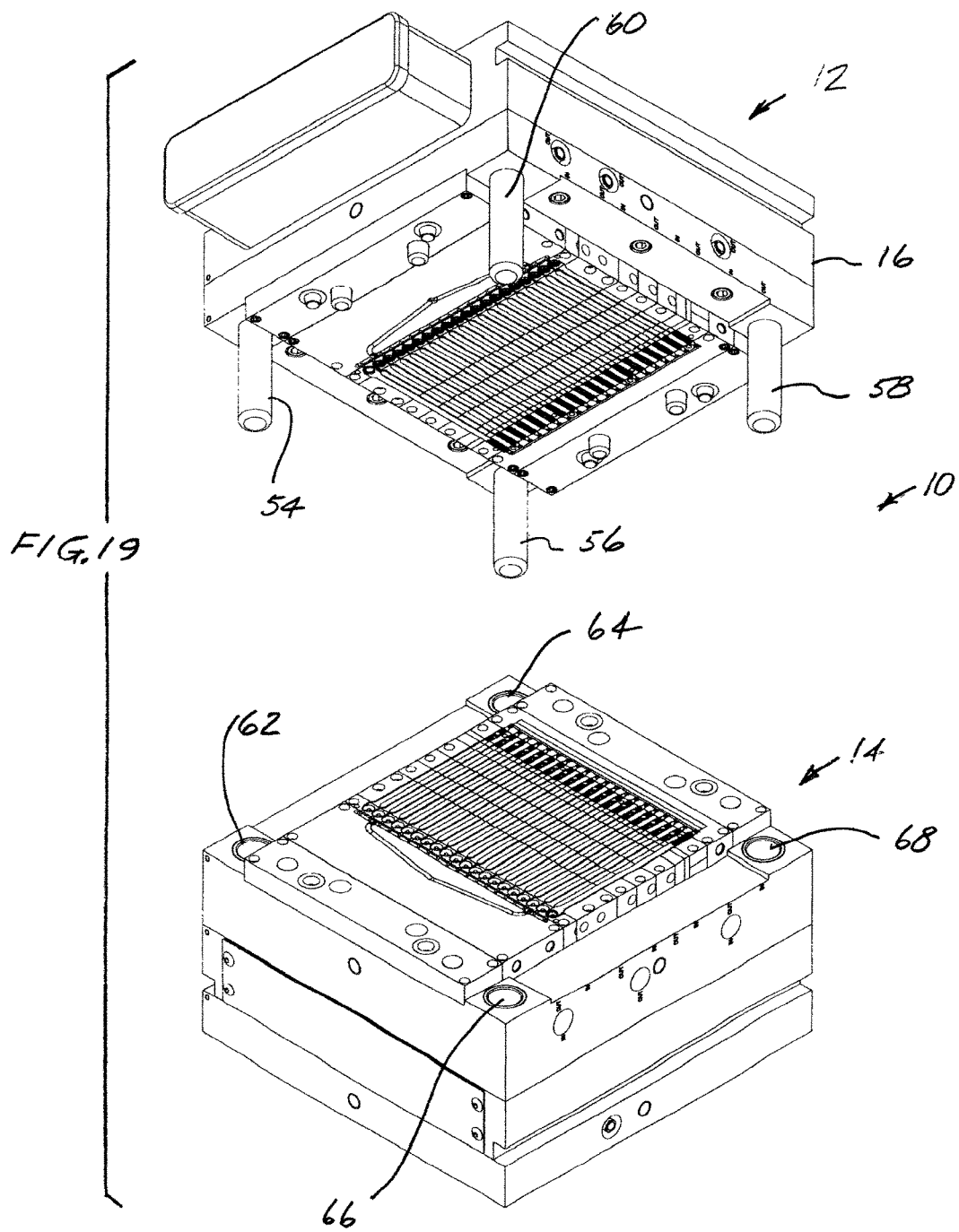
FIG. 19 is an exploded view of the "A" side of the mold in alignment with the "B" side of the mold.
Figure 20:
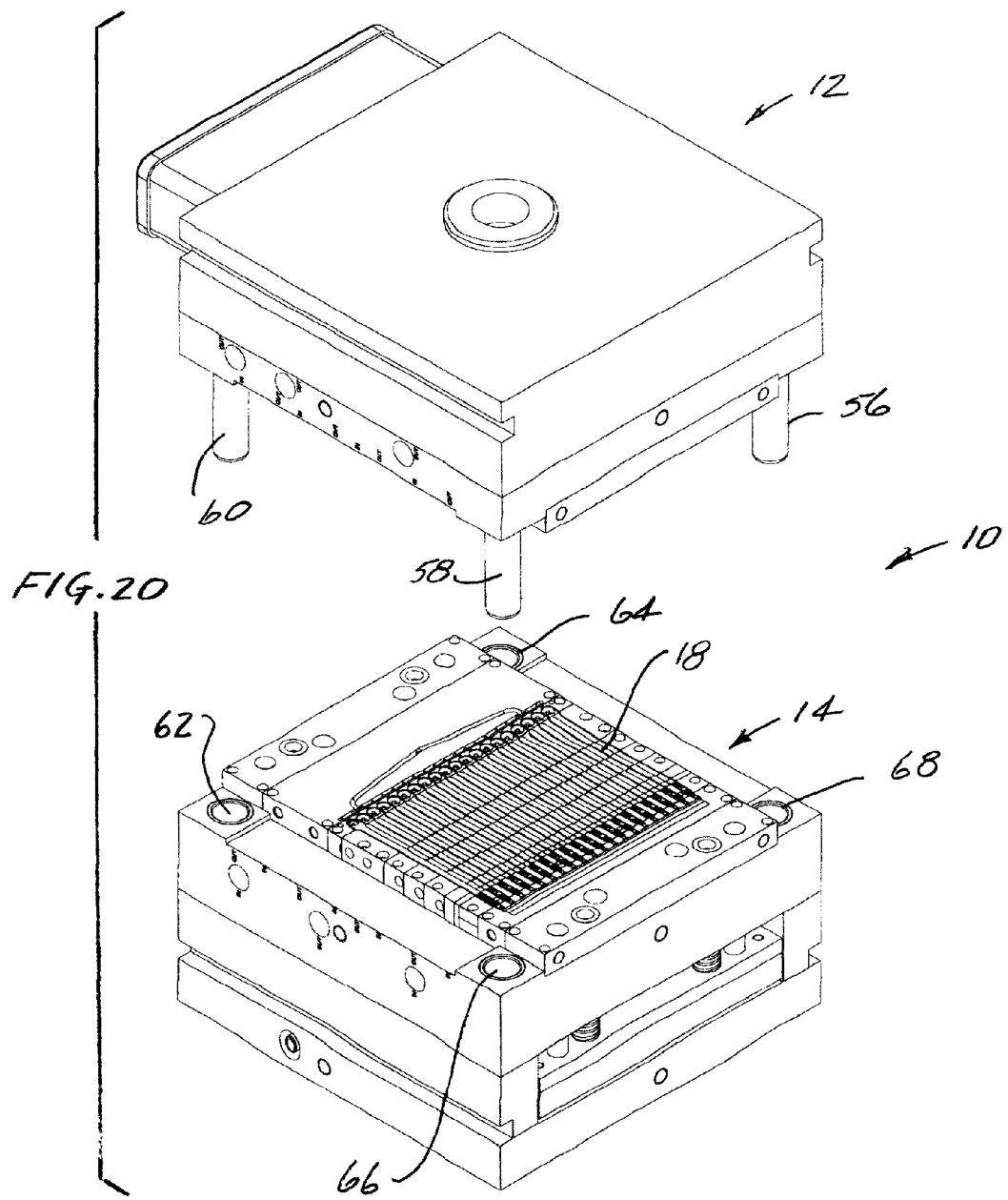
FIG. 20 is an exploded view similar to FIG. 19 but viewed from above.

With reference to the drawings, there is shown in FIGS. 1-20 a mold 10 made in accordance with the present invention. The mold 10 comprises an injection half 12 which is best shown in FIG. 1 and an ejector half 14 which is best shown in FIG. 4. For purposes of reference the injection half 12 is typically called the "A" side of the mold while the ejector half 14 is typically called the "B" side of the mold. The injection half 12 and the ejector half 14 together form the complete mold 10. The complete mold 10 is best shown in FIGS. 19 and 20.

Figure 21:
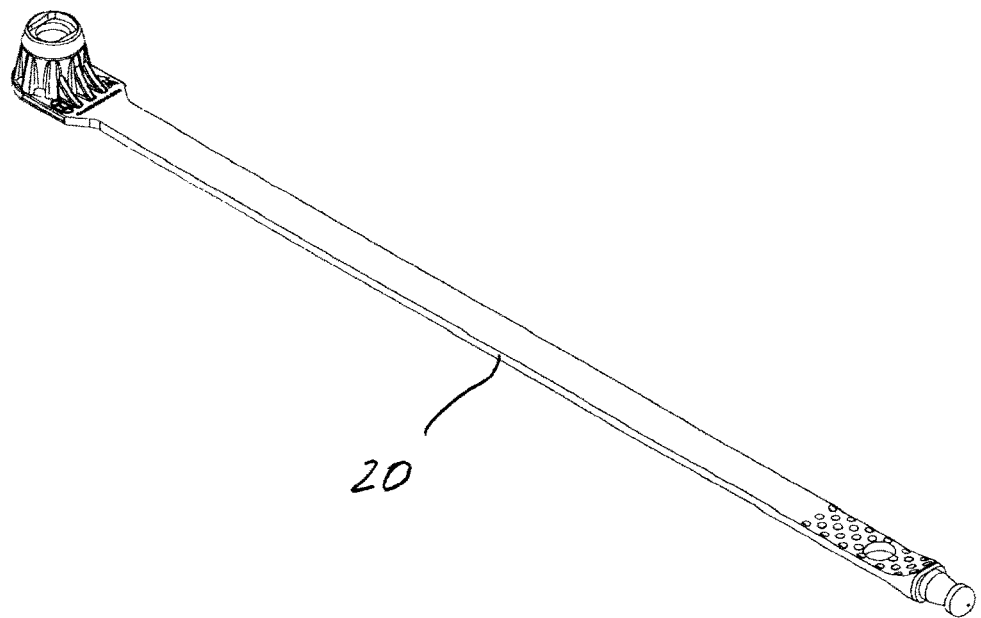
FIG. 21 is a perspective view of a typical product manufactured using the mold according to the present invention.

FIG. 1 is an overall perspective view of the injection half 12 or "A" side of the mold 10 of the present invention. The injection half 12 includes a mold base 16 which includes a plurality of cavities. The cavities are designated in general by the reference numeral 18. For purposes of illustration, FIG. 1 shows a plurality of cavities 18 which have been configured to simultaneously produce a plurality of seals such as the seal 20 which is best shown in FIG. 21.

During use, the cavities 18 are filled with moldable plastic in a fluid or semi-fluid form and subjected to selected parameters of heat and pressure. One of these seals 20 has been illustrated by way of example in FIG. 21. The particular configuration of the mold cavities 18 has been selected by way of illustration only to explain the operation of the mold 10 according to the present invention for the fabrication of a range of different lengths or sizes of the product.

The particular configuration of the cavities 18 which have been illustrated for the manufacture of a plurality of seals does not indicate a limitation on the use of the mold 10 according to the present invention but illustrates the capability of the mold 10 for the fabrication of a range of products of different sizes using a single mold.

The mold base 16 includes a runner 22 or conduit for feeding molten plastic to the plurality of cavities 18 during the operation of the mold 10. A heater assembly 24 is mounted on the end 26 of the mold base 16 to provide heated plastic to the runner 22. The details of the heater assembly 24 are conventional in nature and have therefore not been illustrated in detail.

The mold base 16 supports a plurality of inserts or insert straps 28, 30, 32, 34, 36, 38, 40, 42, 44 each of which is configured as an elongated member. The insert straps 28, 30, 32, 34, 36, 38, 40, 42, 44 which are shown in FIG. 1 are related to the details of construction of the seal 20 which has been shown in FIG. 21. As shown in FIG. 1 the inserts include, in order stated: a barrel insert 28 of the a first strap insert 30, (illustrated by way of example as a two inch wide insert), a second strap insert 32 (illustrated by way of example as a one inch wide insert), a third strap insert 34 (illustrated by way of example as a one inch wide insert), a fourth strap insert 36 (illustrated by way of example as a one inch wide insert), a fifth strap insert 38 (illustrated by way of example as a one-half inch wide insert), a sixth strap insert 40 (illustrated by way of example as a one quarter inch wide insert), a ramp insert 42 and finally a tip insert 44.

Figure 22:
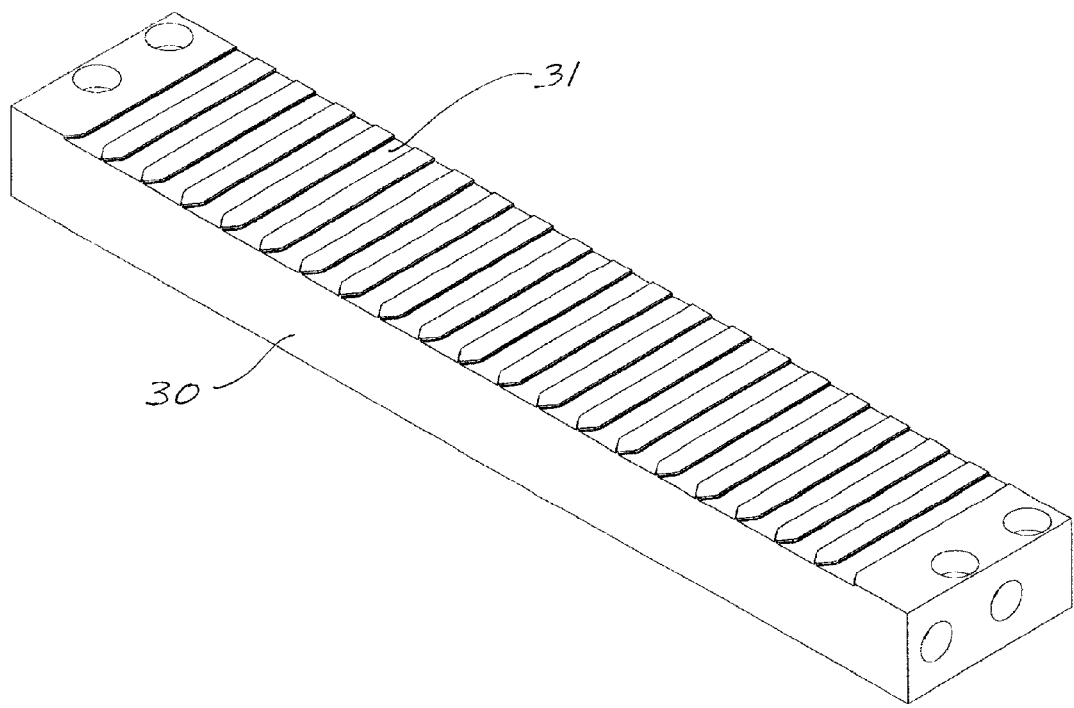
FIG. 22 is a perspective view of a strap insert shown removed from the mold of FIG. 20.

FIGS. 22-29 show selected inserts removed from the mold 10 for clarity of illustration. FIG. 22 shows insert 30 having a plurality of cavities which are typically identified by reference numeral 31.

Figure 23:
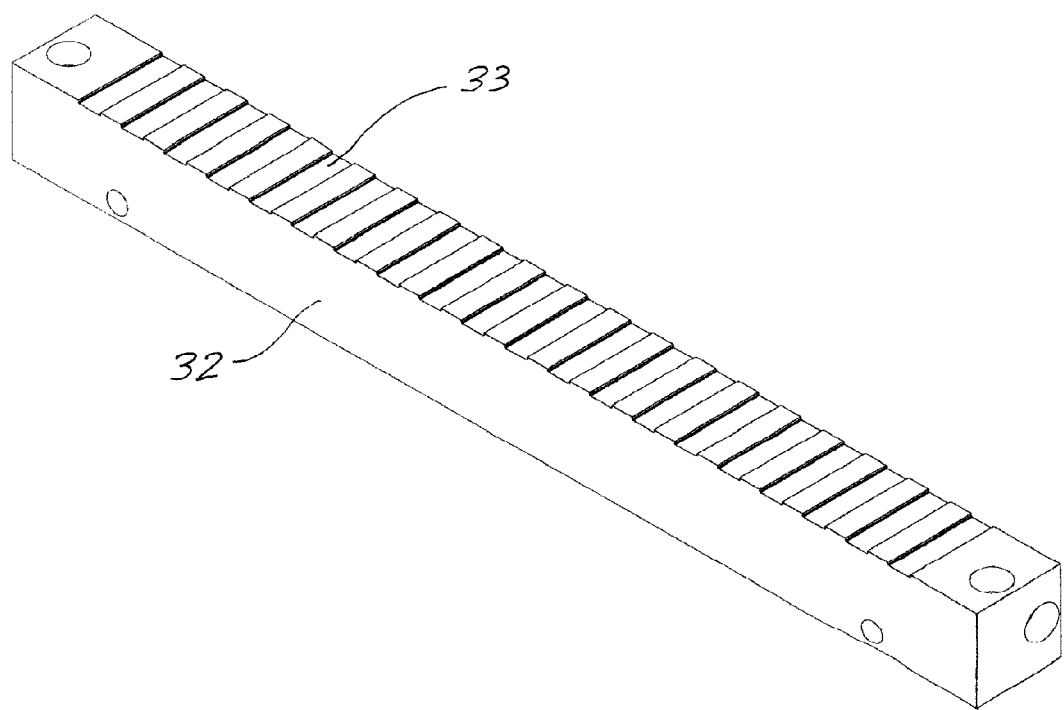
FIG. 23 is a perspective view of another strap insert of reduced width shown removed from the mold of FIG. 20.

FIG. 23 shows insert 32 having a plurality of cavities which are typically identified by reference numeral 33.

Figure 24:
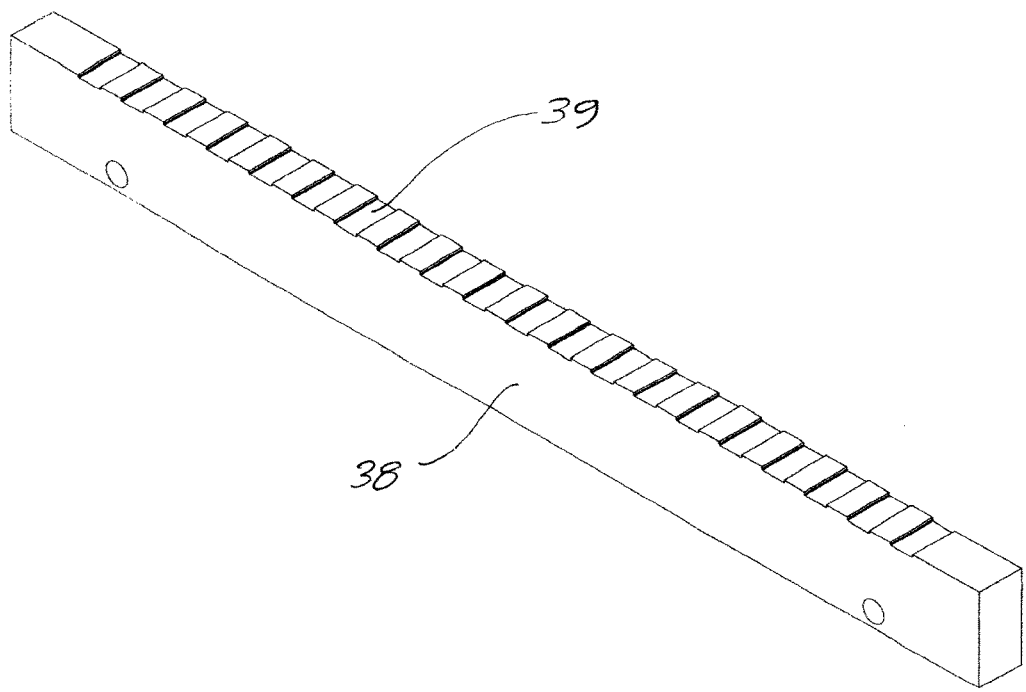
FIG. 24 is a perspective view of another strap insert of reduced width shown removed from the mold of FIG. 20.

FIG. 24 shows insert 38 having a plurality of cavities which are typically identified by reference numeral 39.

Figure 25:
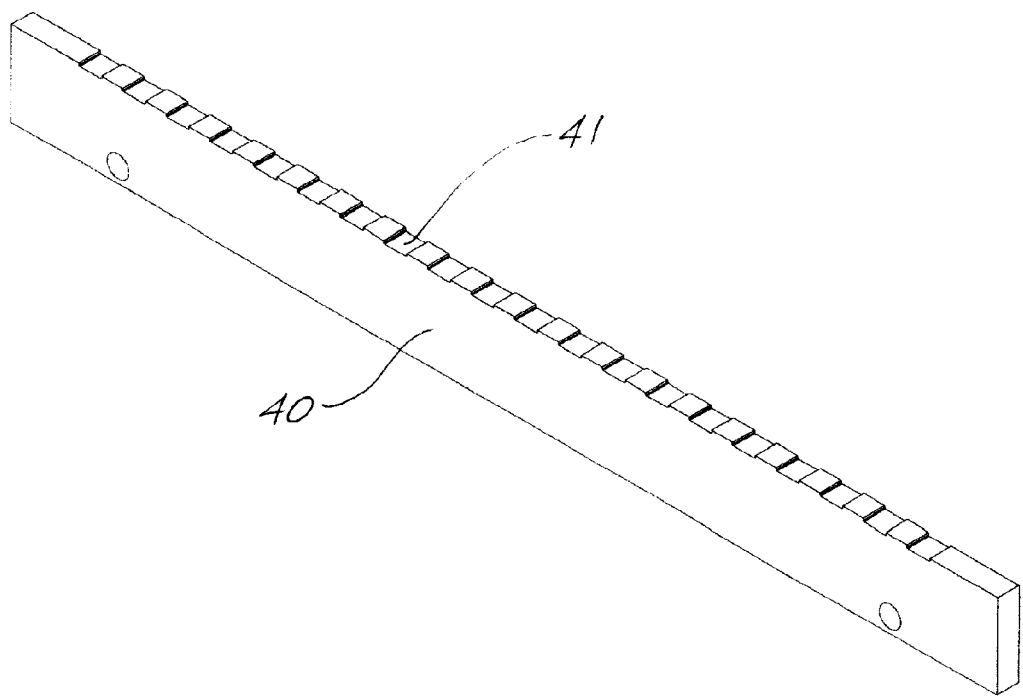
FIG. 25 is a perspective view of yet another strap insert of reduced width shown removed from the mold of FIG. 20.

FIG. 25 shows insert 40 having a plurality of cavities which are typically identified by reference numeral 41.

Figure 26:
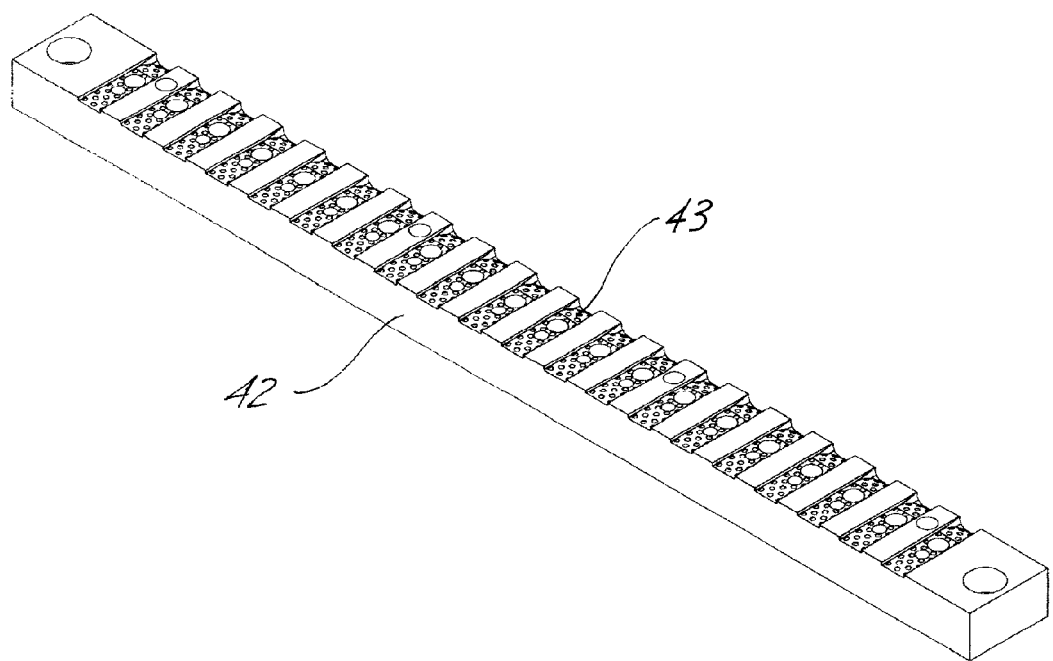
FIG. 26 is a perspective view of another strap insert shown removed from the mold of FIG. 20.

FIG. 26 shows insert 42 having a plurality of cavities which are typically identified by reference numeral 43.

Figure 27:
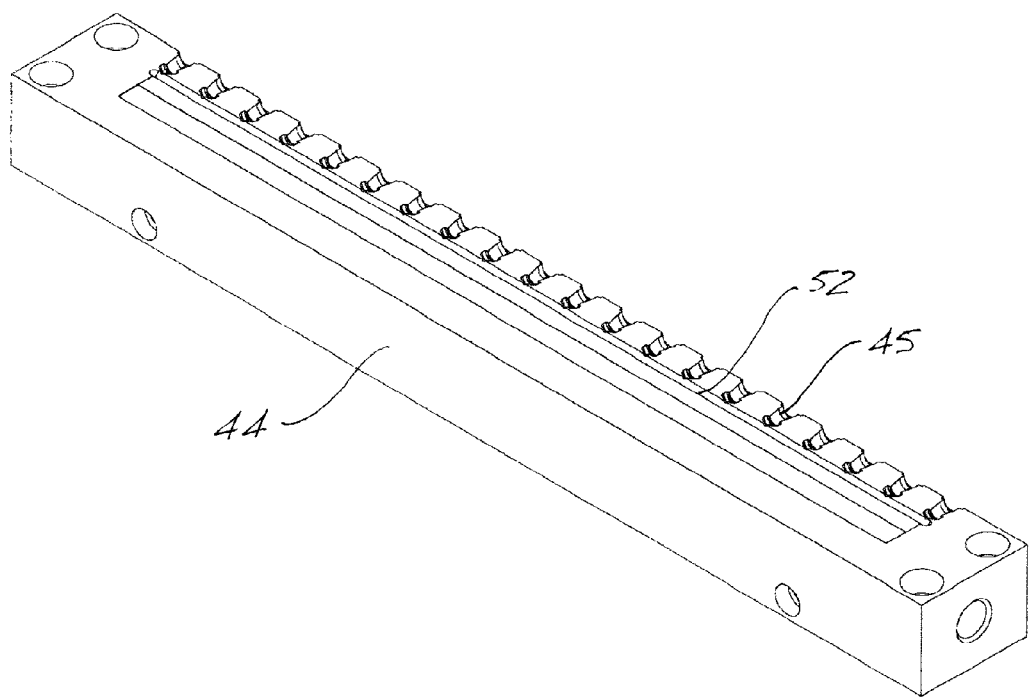
FIG. 27 is a perspective view of another strap insert shown removed from the mold of FIG. 20.
Figures 28, 29:
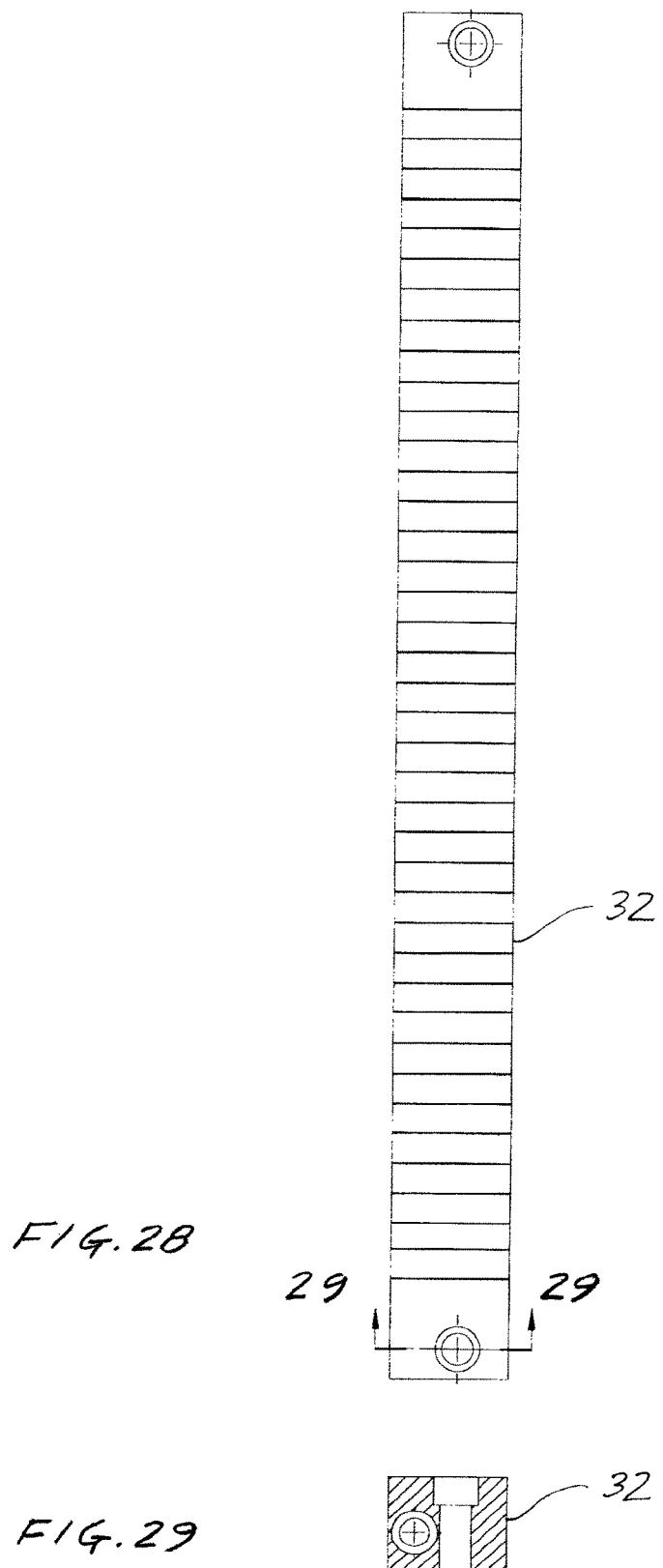
FIG. 28 is a plan view of yet another strap insert shown removed from the mold of FIG. 20.
FIG. 29 is a cross-sectional view a strap insert taken along the line 29-29 of FIG. 28.

FIG. 27 shows insert 44 having a plurality of cavities which are typically identified by reference numeral 45.

When the inserts 28, 30, 32, 34, 36, 38, 40, 42, 44 are assembled in the mold 10 as shown in FIG. 1, the various cavities 31, 33, 39, 41, 43, 45 in combination, form the negative geometry of the seal 20 which is shown in FIG. 21.

FIG. 1 also illustrates additional elements of the mold 10 including the heater assembly 24 which supplies heated molten plastic to the mold cavities. Twenty identical mold cavities 18 are shown for the simultaneous molding of twenty seals with each seal as illustrated in FIG. 21. The mold base 16 supports the various insert straps. The tip insert 44 has a runner 52.

The injection half 12 of the mold 10 also includes four guide pins 54, 56, 58, 60 which enter four complementary guide holes or bushings 62, 64, 66, 68, which are formed in the ejector half 14 of the mold 10 when the mold 10 is closed. The guide holes or bushings 62, 64, 66, 68 are best shown in FIG. 4.

Figure 2:
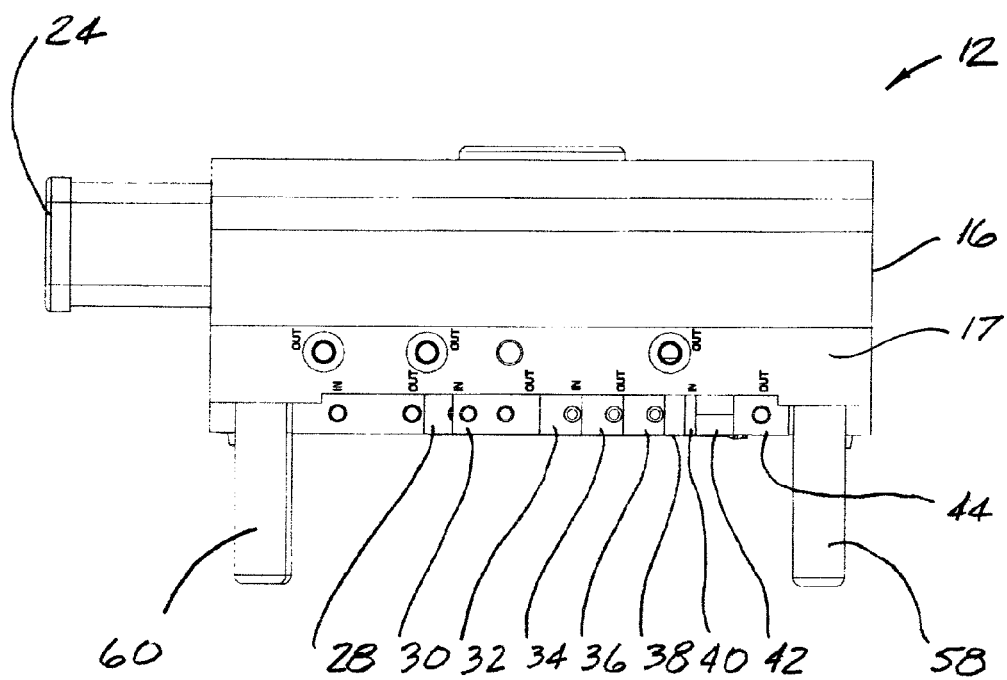
FIG. 2 is a side elevation view taken along the line 2-2 of FIG. 1.

FIG. 2 is a side elevation view of the injection half 12 of the mold 10 and shows the heater assembly, the mold base 16 and the insert straps 28, 30, 32, 34, 36, 38, 40, 42, 44.

Figure 3:
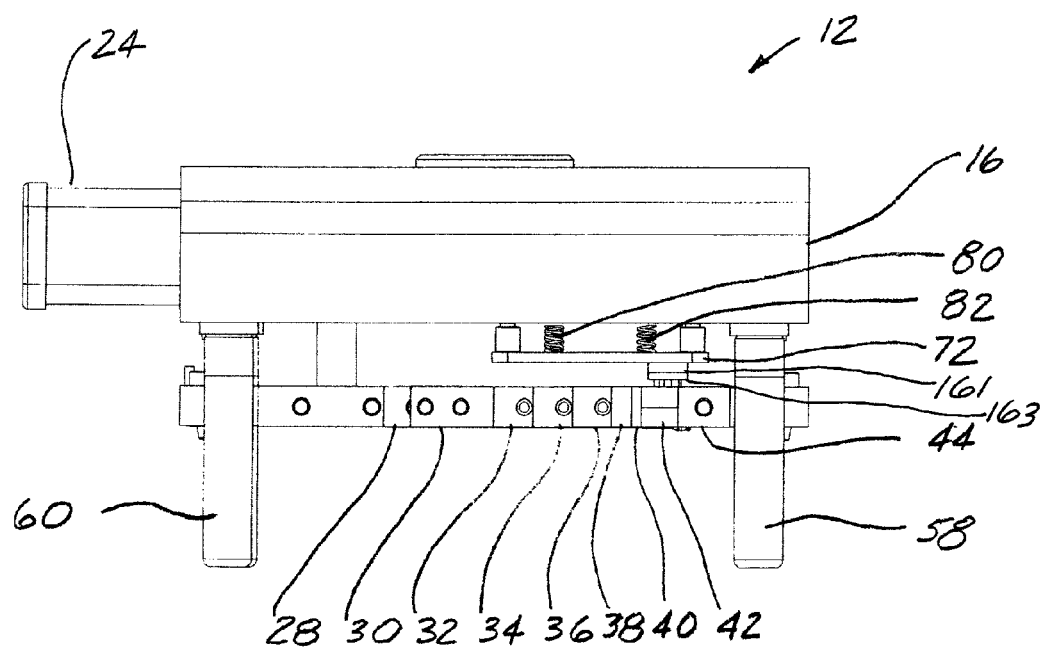
FIG. 3 is a side elevation view similar to FIG. 2 showing the cavity plate removed to reveal details of internal construction.
Figure 4:
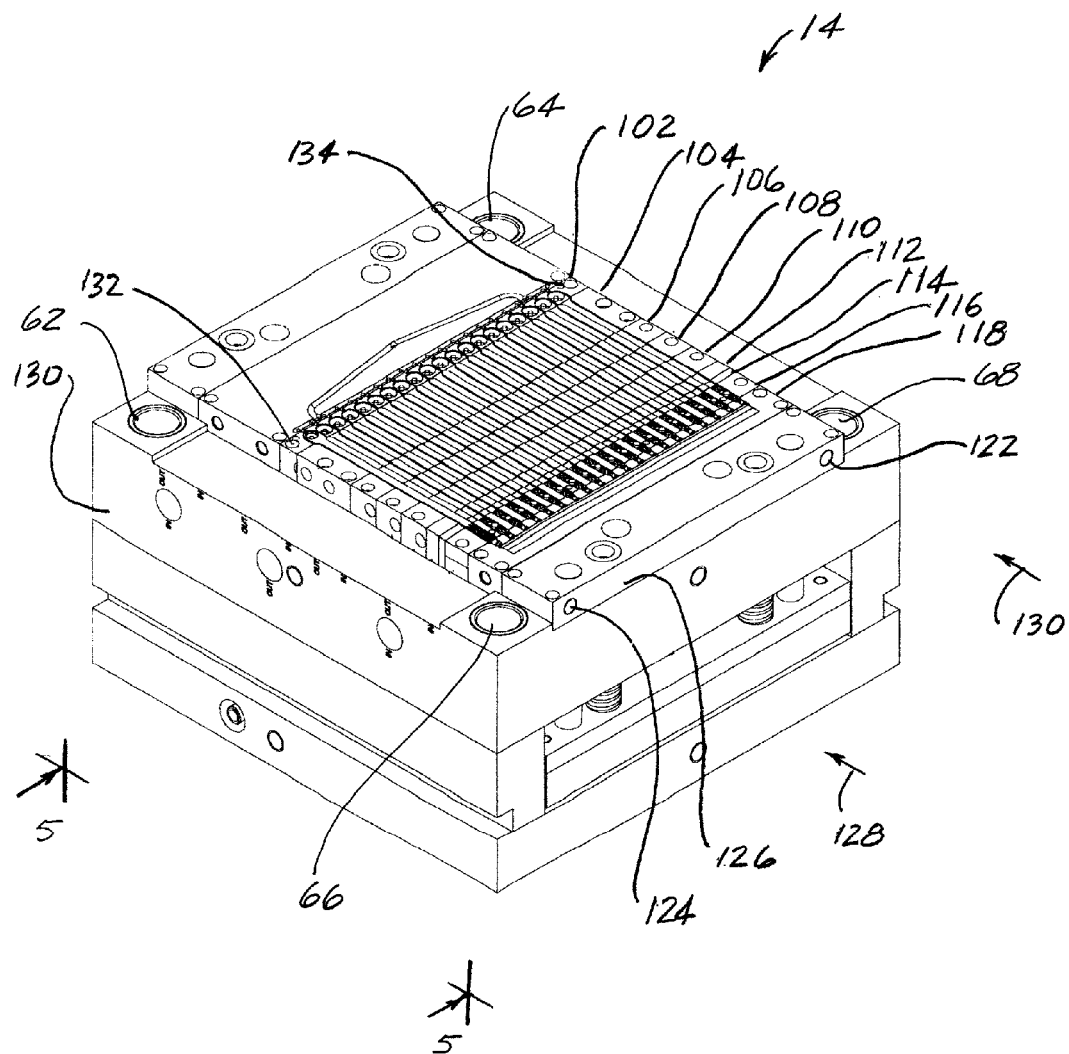
FIG. 4 is an overall perspective view of the ejector half or "B" side of the mold of FIG. 1.
Figure 5:
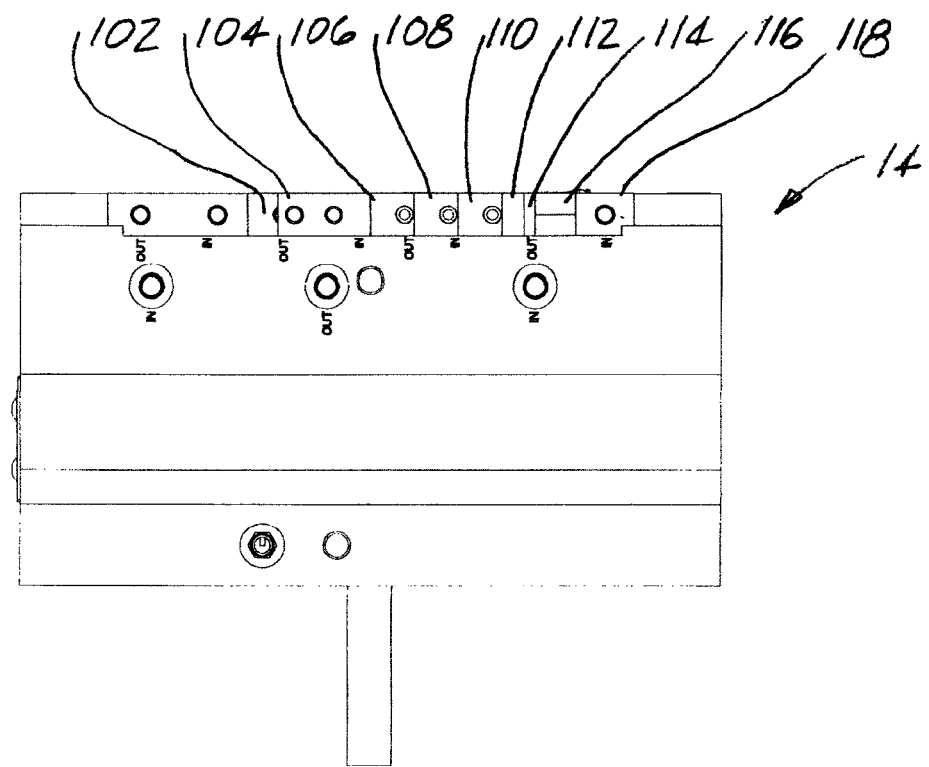
FIG. 5 is a side elevation view taken along the line 5-5 of FIG. 4.

In FIG. 3 a plate 17 which forms part of the mold base 16 has been removed to illustrate the springs 80, 82 which bear against the sub-ejector plate 72.

FIG. 4 illustrates the ejector half 14 or "B" side of the mold 10 and illustrates both the structure and the technique for assembly, clamping and holding the strap inserts 102, 104, 106, 108, 110, 112, 114, 116, 118. The width of each of the strap inserts and the arrangement of the strap inserts 102, 104, 106, 108, 110, 112, 114, 116, 118 on the "B" side 14 of the mold 10 are the same as previously described in connection with the "A" side 12 of the mold 10. The strap inserts 102, 104, 106, 108, 110, 112, 114, 116, 118 are clamped together by a pair of screws which are illustrated schematically by the circles 122, 124 in FIG. 4. The screws are threaded through the screw block 126 and when rotated exert a force in the direction shown by the arrows in 128, 130 in FIG. 4 on all of the insert straps. All of the insert straps 102, 104, 106, 108, 110, 112, 114, 116, 118 are thus clamped together. After the insert straps 102, 104, 106, 108, 110, 112, 114, 116, 118 have been clamped together. Each of the individual insert straps 102, 104, 106, 108, 110, 112, 114, 116, 118 are bolted to the mold base 130 using screws which are illustrated schematically by the circles 132, 134. It should be understood that each of the insert straps is bolted to the mold base 130 by screws which have been identified typically and schematically by circles 132, 134.

The contour and shape of the individual insert straps 102, 104, 106, 108, 110, 112, 114, 116, 118 complement the contour and shape of the insert straps 28, 30, 32, 34, 36, 38, 40, 42, 44 and together form the cavities 18 which form the product such as the seal 20 shown in FIG. 21. The technique for clamping and holding the insert straps 102, 104, 106, 108, 110, 112, 114, 116, 118 described in connection with the injection half 12 of the mold 10 is the same as on the ejector half 14

During use, the mold 10 is mounted in a conventional molding machine which has not been illustrated.

Figure 6:
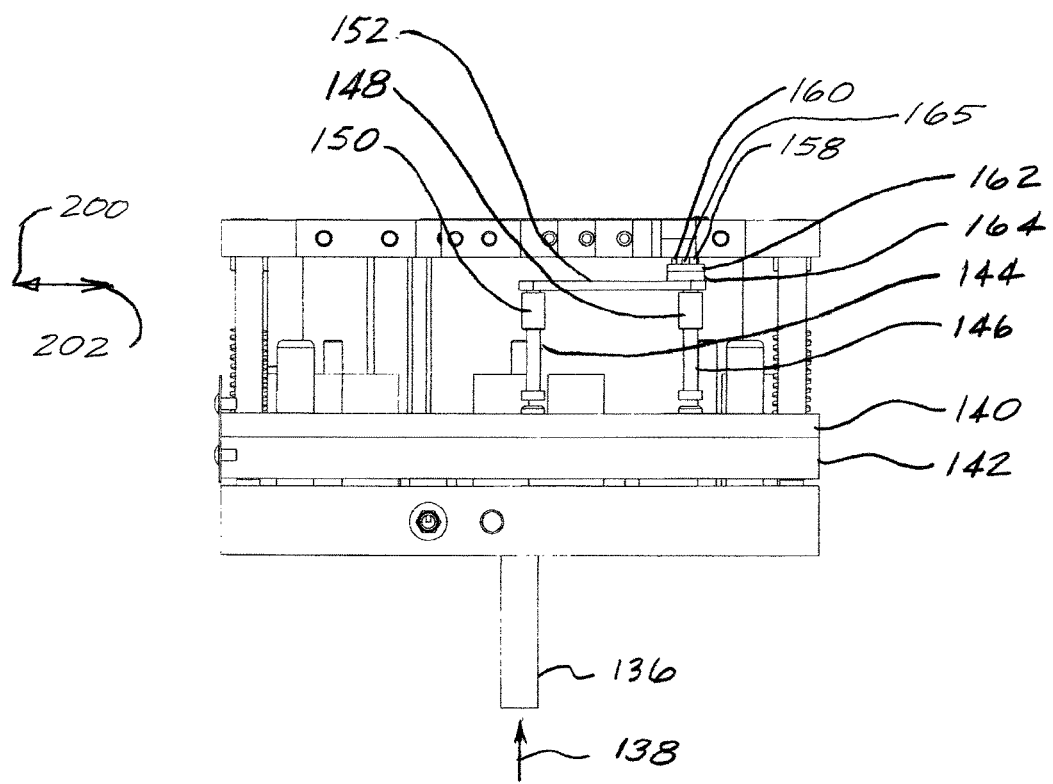
FIG. 6 is a side elevation view similar to FIG. 5 showing plates removed to reveal details of internal construction of the ejector mechanism.

After the mold 10 has opened, an activator pin on the molding machine which is of conventional construction, (not illustrated) which is disposed in alignment with the pin 136 on the mold 10 pushes upward on the pin 136 in the direction shown by the arrow 138 in FIG. 6. This action moves the ejector plates 140 and 142 in an upward direction shown by the arrow 138. The ejector plates 140 and 142 push upward bearing against pins which have been illustrated typically as the pins 144, 146 which ride in bushings 148, 150. The pins 144, 146 press upwardly on bumper bar 152. The bumper bar 152 presses on sub-ejectors 162, 164. The sub-ejectors 162, 164 have pins 158, 160 which push the molded part out of the mold 10.

The sub-ejectors 162, 164 are a key feature of the present invention and are movable in directions shown by the arrows 200, 202 in FIG. 6 as will be presently explained.

Figure 9:
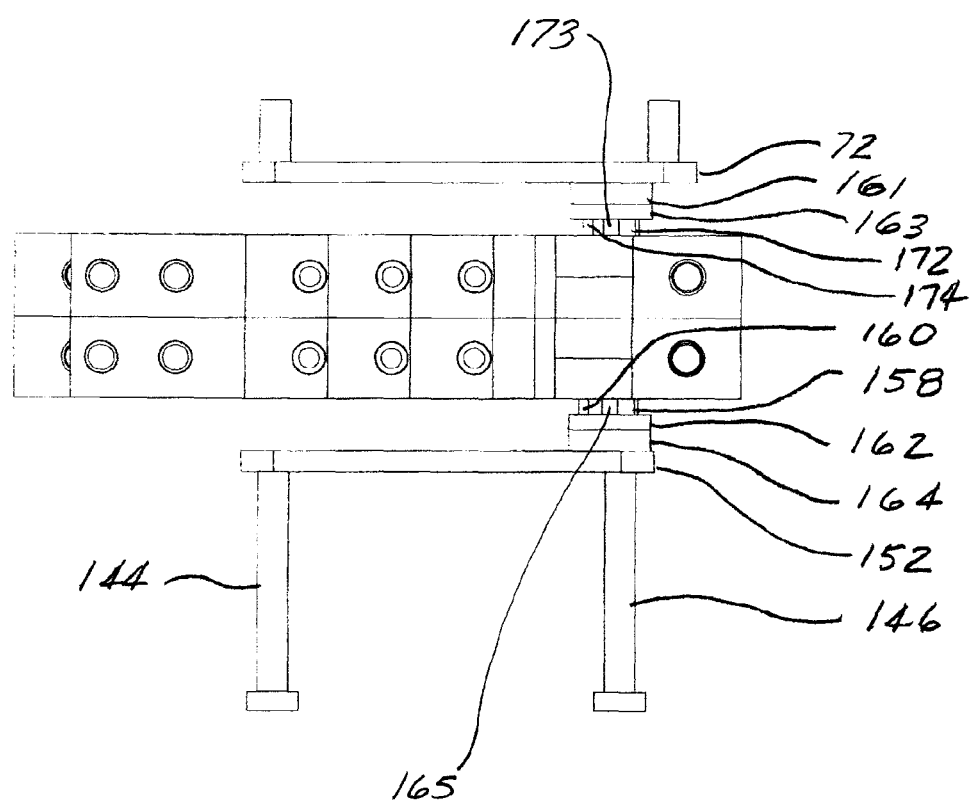
FIG. 9 is an elevation view taken along the line 9-9 of FIG. 7 with selected parts removed for clarity of illustration.

A reset pin 165 shown in FIGS. 6 and 9 serves to reset the position of the sub-ejectors 162, 164 to the position shown in FIGS. 6 and 9.

Figure 7:
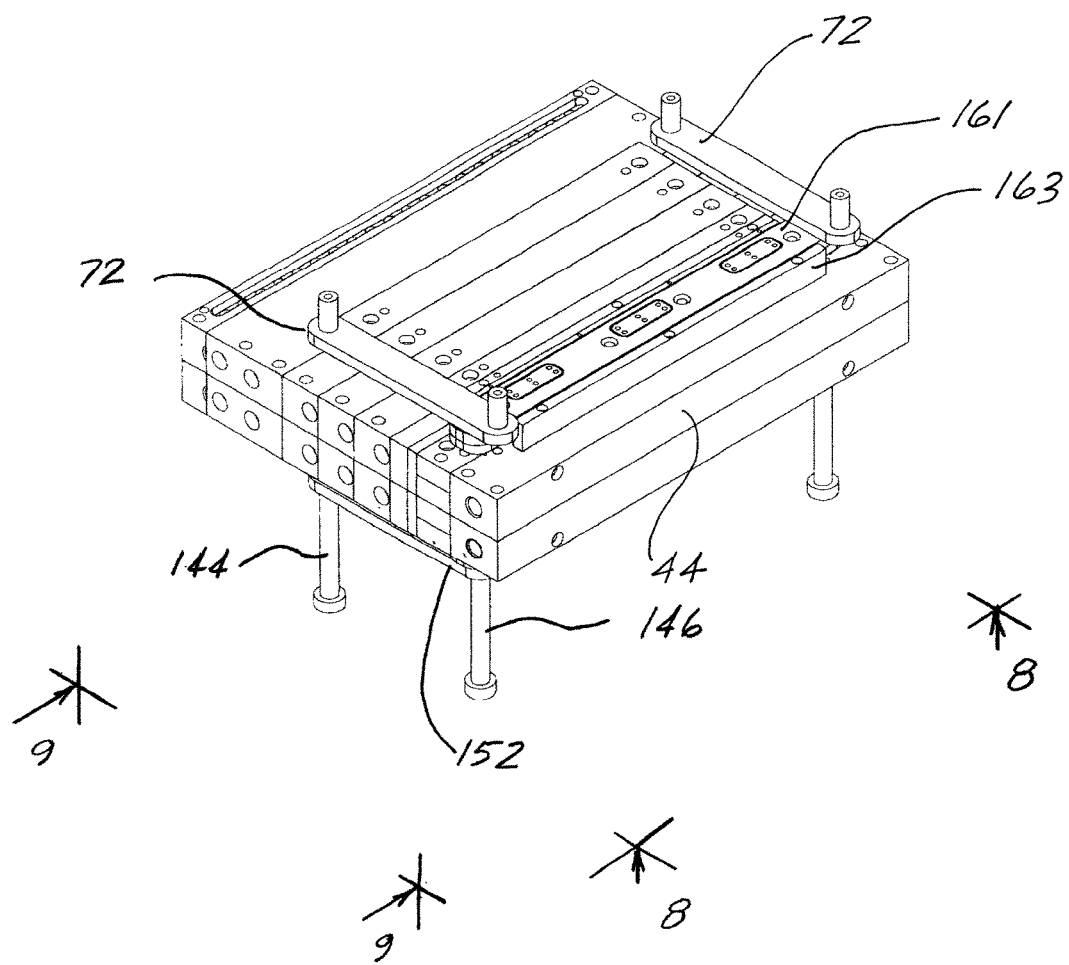
FIG. 7 shows the "A" side of the mold placed on top of the "B" side of the mold with the assembled mold shown in the closed position and with selected parts removed for clarity of illustration.
Figure 8:
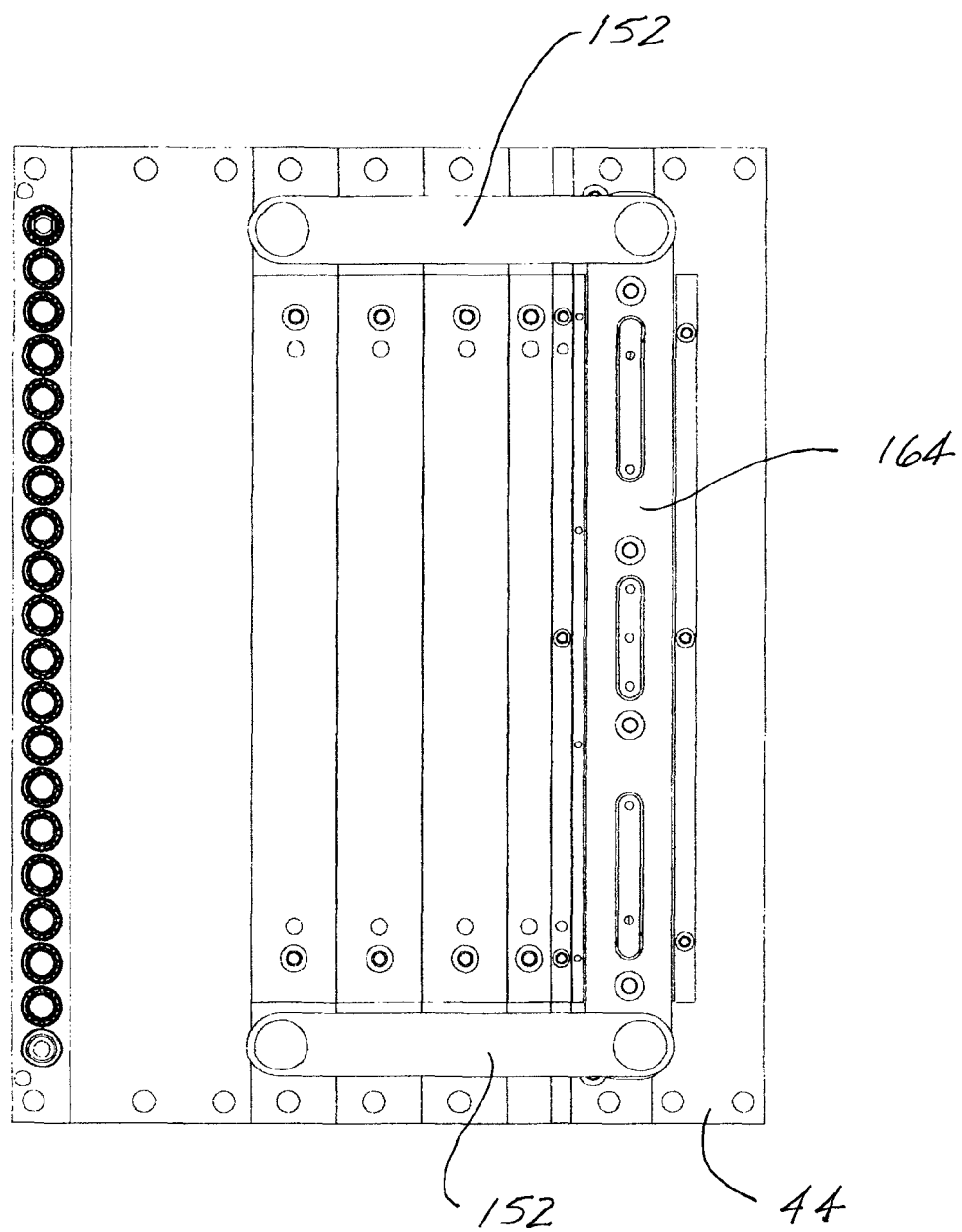
FIG. 8 is a plan view taken along the line 8-8 of FIG. 7.

In FIG. 7 selected components have been removed thereby allowing FIG. 7 to illustrate the orientation of the bumper bars 72, 152 as disposed generally perpendicular to the previously described strap inserts 28, 30, 32, 34, 36, 38, 40, 42, 44 and 102, 104, 106, 108, 110, 112, 114, 116, 118. For clarity of illustration, in FIG. 7, the various strap inserts have been identified typically by reference numeral 44. During operation, the bumper bars 72, 152 are urged to press against the sub-ejectors 162, 164, 161, 163 to remove the molded parts from the mold 10. The various strap inserts have been shown as generally elongated members as shown in FIG. 1 and FIGS. 22-28. The orientation of the bumper bars 72, 152 as generally perpendicular to the various strap inserts enables the bump bars 72, 152 to eject molded parts from the mold 10 even though the mold 10 has been adjusted to produce parts of various lengths.

Figure 10:
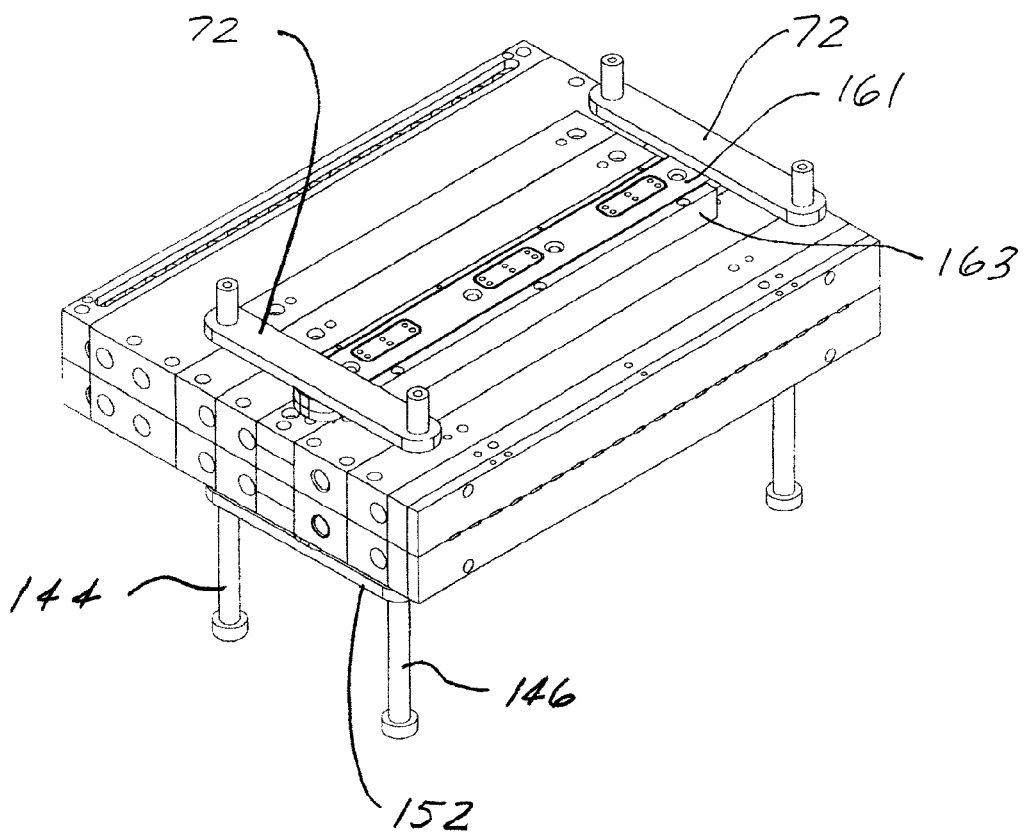
FIG. 10 is a perspective view of the mold similar to FIG. 7 showing the sub-ejector assembly and the cavity inserts rearranged for the manufacture of a product of a different length.

FIG. 10 is a perspective view similar to FIG. 7 however, in FIG. 10 the sub-ejector 161, 163 have been moved to accommodate fabrication of a part having a different length. The order of the various inserts has also been rearranged to accommodate fabrication of the different length part.

Figure 11:
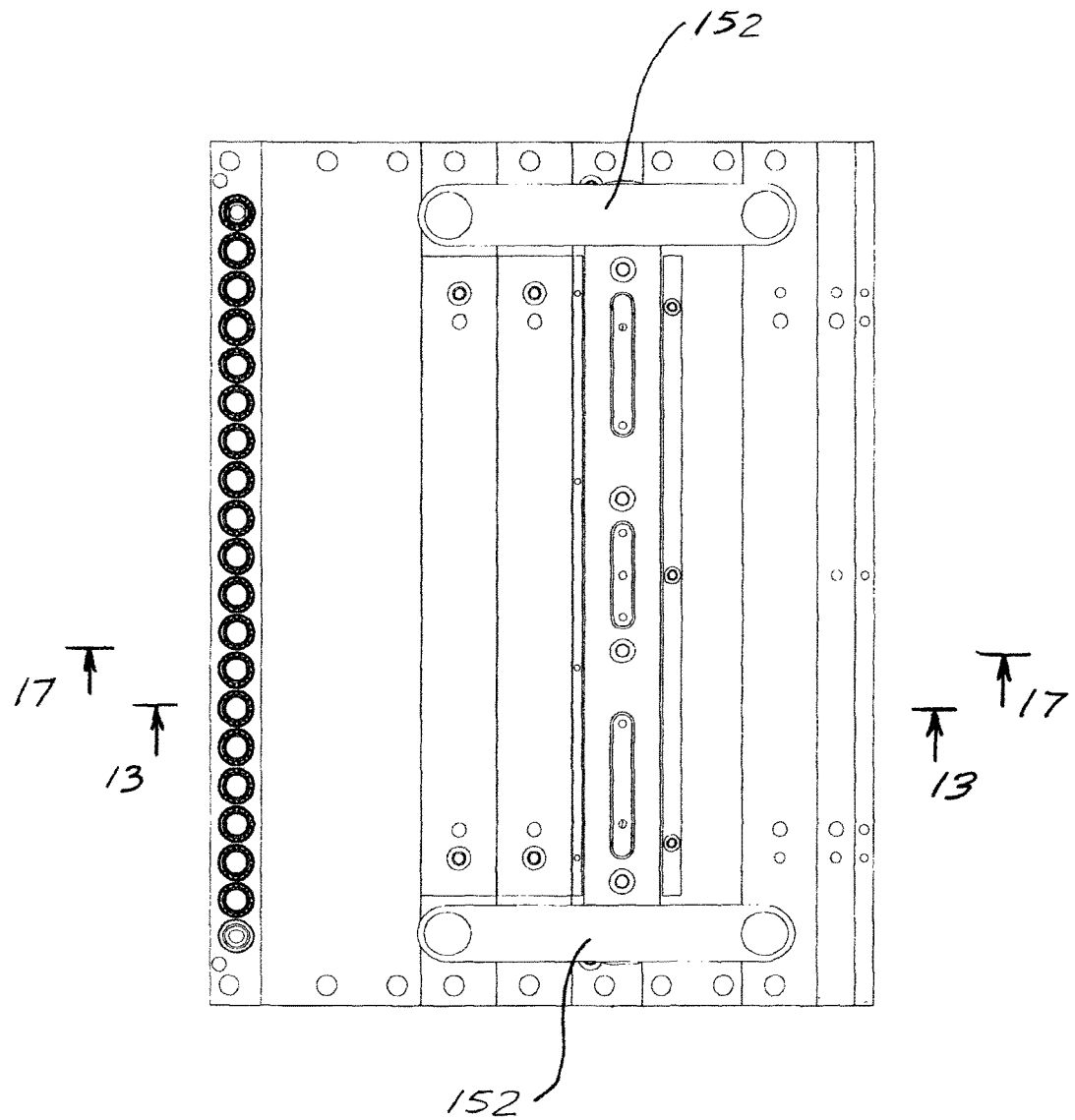
FIG. 11 is a plan view similar to FIG. 8 showing the sub-ejector assembly and the cavity inserts rearranged for the manufacture of a product of a different length.

FIG. 11 also shows the sub-ejector 164 having been moved from the position shown in FIG. 6.

Figure 12:
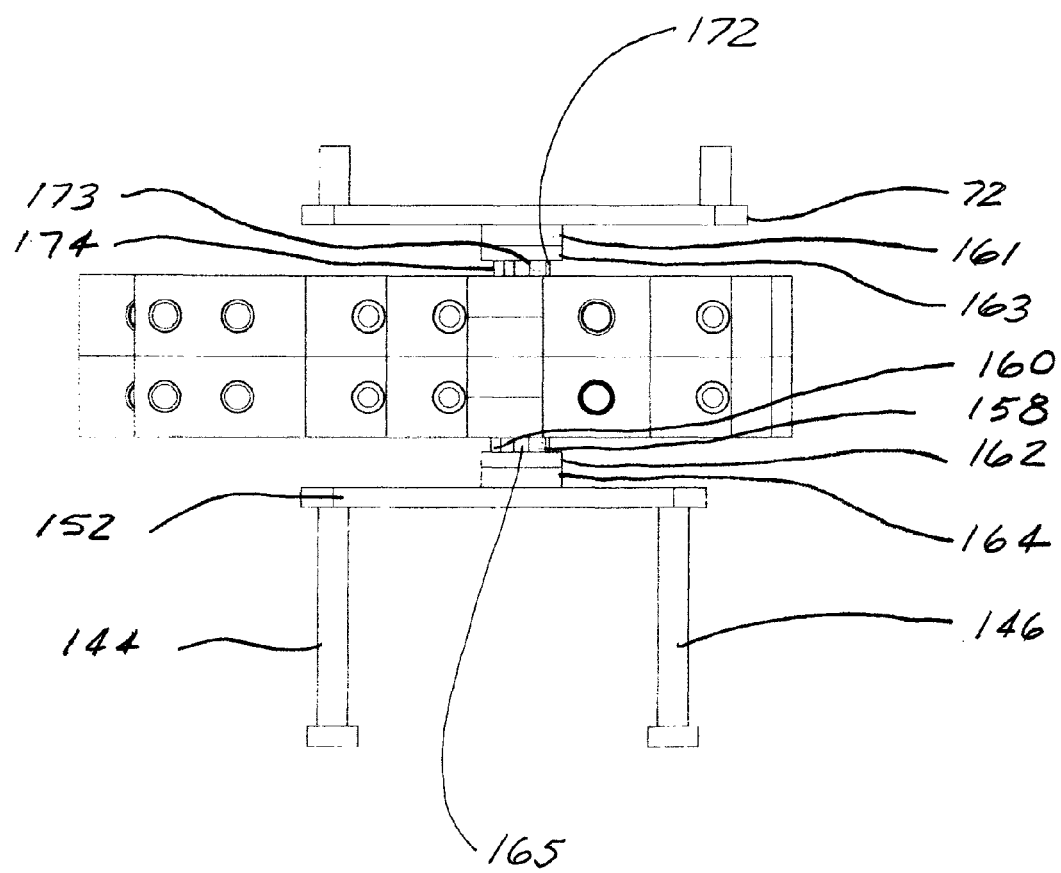
FIG. 12 is an elevation view showing the mold in the position previously shown in FIG. 9 with selected parts removed for clarity of illustration.

FIG. 12 is an elevation view showing the new position of the sub-ejectors 161, 163, 162, 164 and the ability of the bumper bars 72, 152 to operate the sub-ejectors 161, 163, 162, 164 even though the sub-ejectors 161, 163, 162, 164 have been moved.

Figure 13:
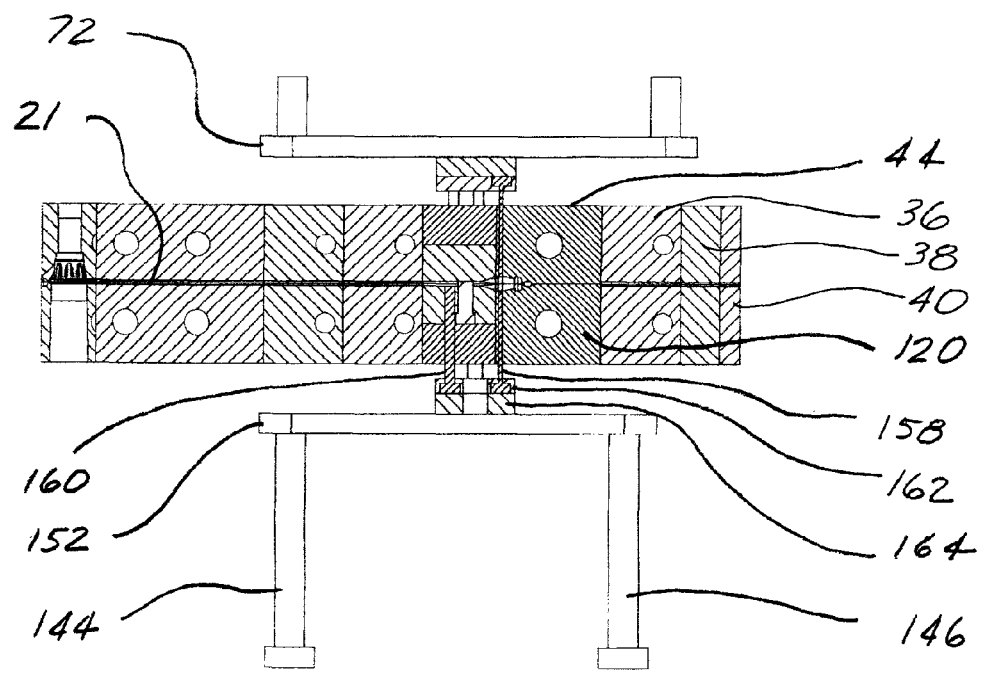
FIG. 13 is a cross-sectional view taken along the line 13-13 of FIG. 11 showing a cross section of the ejector pins with selected parts removed for clarity of illustration.

FIG. 13 is a cross-sectional view which shows the relationship between the various insert straps which have been indicated typically by the insert strap 44 and the ejector pins 158 160, 172, 174. The bumper bars 72, 152 are shown bearing on the sub-ejectors 161, 163, 162, 164 to enable the ejector pins 158, 160, 174 to eject the finished part from the mold 10. FIG. 13 also shows that the insert straps 36, 38, 40 have been repositioned to the right of insert strap 44.

Figure 14:
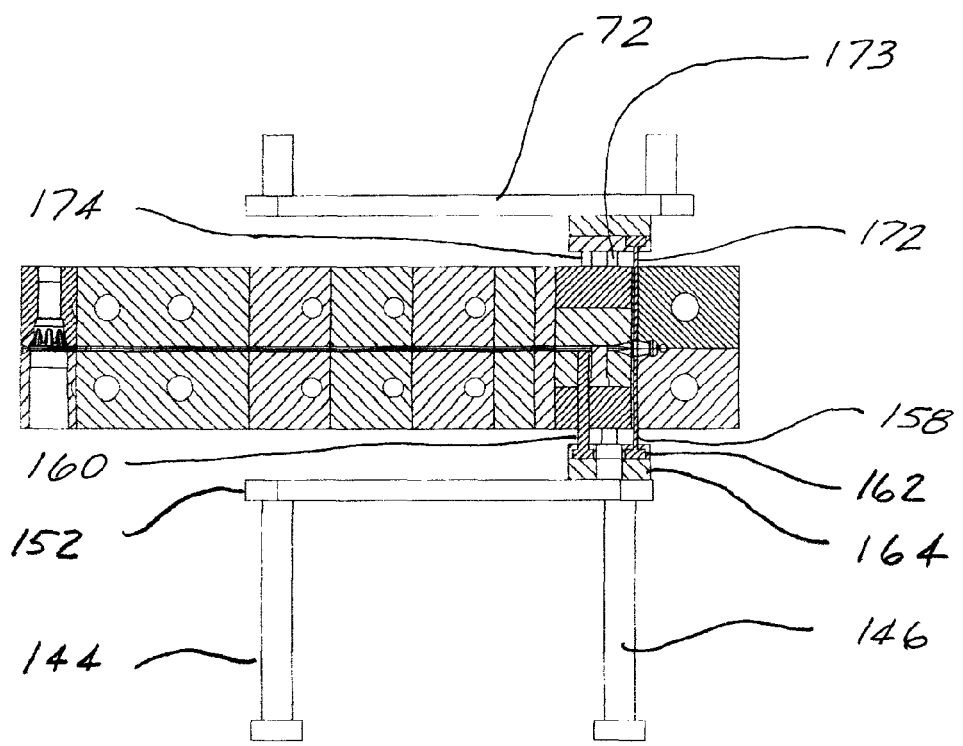
FIG. 14 is a cross-sectional view taken along the line 13-13 of FIG. 11, similar to FIG. 13, showing a cross-section of the ejector pins but showing the ejector pins moved to facilitate manufacture of a product of a different length with selected parts removed for clarity of illustration.

In FIG. 14 the sub-ejectors 162, 164 have been moved to the right to manufacture a relatively longer seal.

Figure 15:
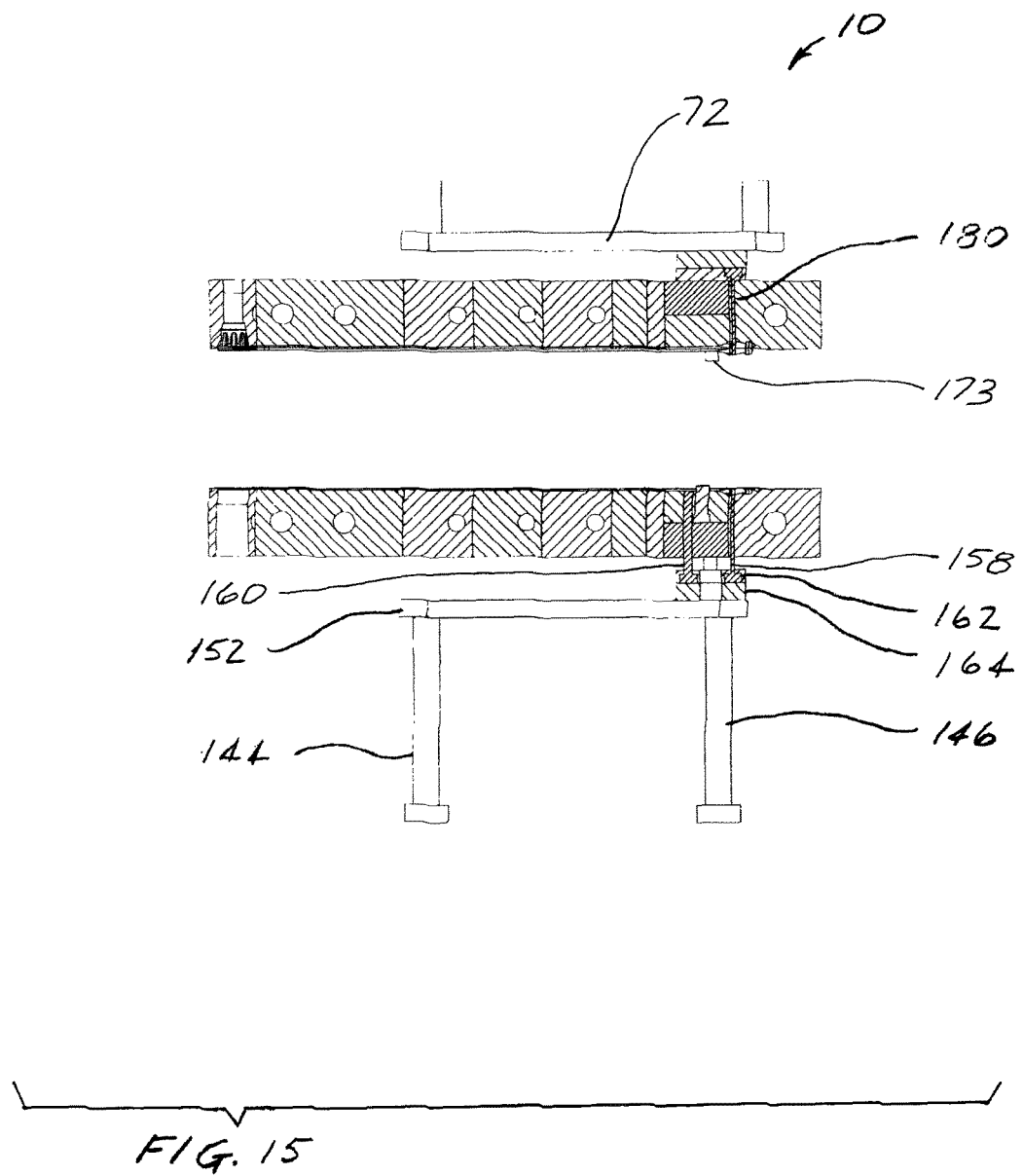
FIG. 15 is a cross-sectional view taken along the line 13-13 of FIG. 11, similar to FIG. 14, showing the mold in the open position.

FIG. 15 shows the mold 10 in the open position with the sub-ejectors 162, 164 in the same position as shown in FIG. 14.

The sequence of operations of the mold 10 may be described as follows with reference to FIGS. 14-16. FIG. 14 shows the mold 10 in the closed position. The ejector pins 161, 163, 162, 164 are shown in the retracted position and do not project into the mold cavity. In this position the mold 10 has just completed the molding of the part 20.

FIG. 15 shows the mold 10 just opened. Pins 158, 160 have pushed the part 20 out of the cavities on the side 14 of the mold 10. The part 20 is still on the ejector side 12 of the mold 10.

Figure 16:
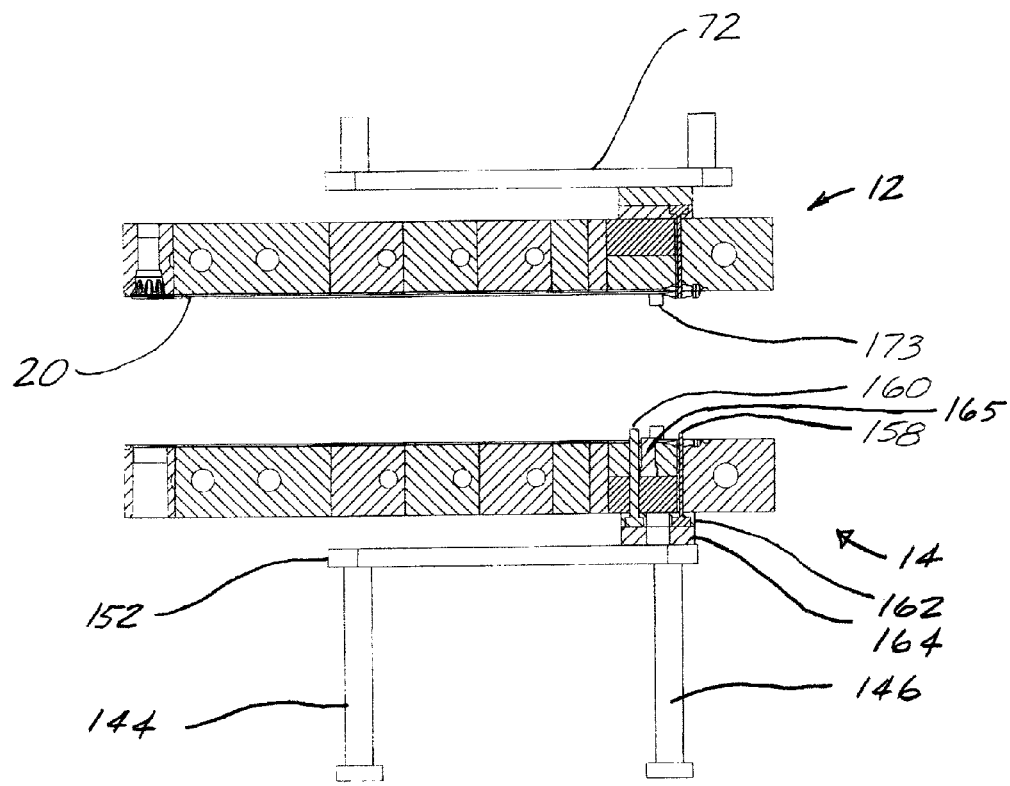
FIG. 16 is a cross-sectional view taken along the line 13-13 of FIG. 11, similar to FIG. 15 showing the ejector pins moved in an upward direction to eject a molded product from the mold.

FIG. 16 shows mold 10 opened and the part 20 is still on the side 12 of the mold 10.

Figure 17:
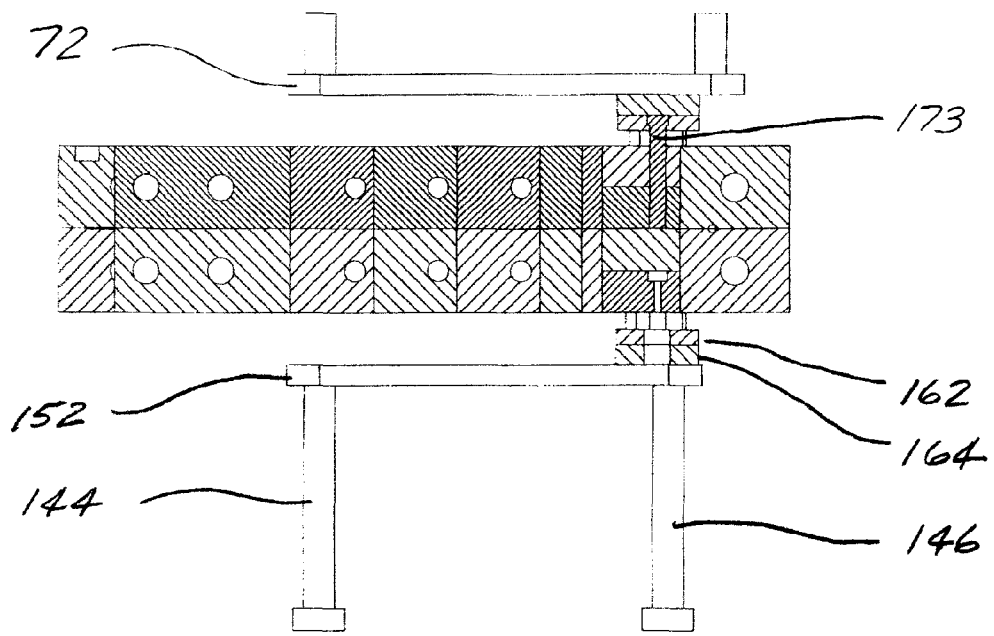
FIG. 17 is a cross-sectional view taken along the line 17-17 of FIG. 11 showing the return pin in cross section.
Figure 18:
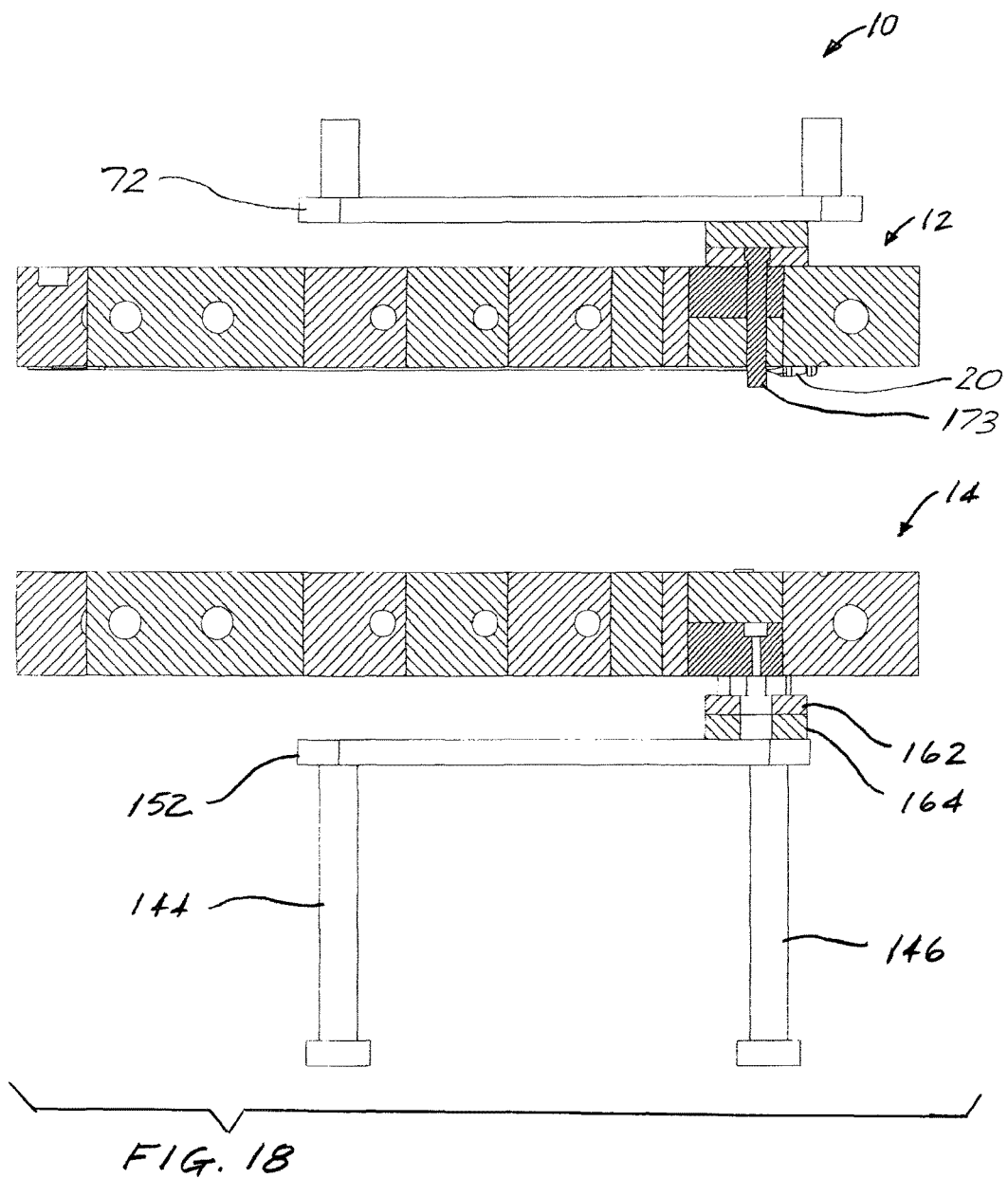
FIG. 18 is a cross-sectional view taken along the line 17-17 of FIG. 11 showing the return pin in a lowered position.

To return the mold 10 to the closed position shown in FIG. 17, sub-ejectors on side 12 of the mold 10 have ejected the part 20 from the cavities on side 12 of the mold 10 and reset pins 173, 165, which are best shown in FIGS. 9 and 16, have moved the sub-ejectors previously described to retracted positions in which the ejection pins do not project into the mold cavities. The mold 10 is thus ready to mold another part.

A key feature of the present invention is the ability of a user to easily reconfigure the mold 10 to produce parts of different sizes or shapes. One such part 20 has been illustrated by way of example in FIG. 21. The mold 10, according to the present invention, is able to produce multiple products as shown in FIG. 21 simultaneously using the side-by-side cavities 18 previously described. As previously described, the various strap inserts of the mold 10 may be rearranged to produce parts similar to the part shown in FIG. 21 but of different lengths.

The configurations of the various strap inserts have been illustrated typically in FIGS. 22-29. FIGS. 22-29 illustrate that the various strap inserts are of different widths. As described previously the individual strap inserts are combined and clamped together to form the desired configuration of the product. The formation of the mold cavity as a result of the combination of individual strap inserts enables a user to easily change the configuration of the part manufactured by the mold 10.

The present invention also provides a method for making and modifying an injection mold which enables a user to quickly modify an injection mold to enable the injection mold to produce products of different lengths or different configurations or geometries.

The method according to the present invention comprises the following steps:
1. Providing an injection mold having a plurality of cavity insert bars each of which has a portion of a desired mold cavity.
2. Forming a complete mold cavity extending across a plurality of the cavity insert bars.
3. Clamping the cavity insert bars together within an injection mold body to form a rigid unit.

4. Adjusting the size of the mold cavity by adjusting the number of cavity insert bars selected to form a complete mold cavity of a different configuration.

The present invention also provides an alternative method in which steps 1-3 are the same as steps 1-3 above and step 4 is replaced by the following step:

adjusting the size of the mold cavity by repositioning selected insert bars to form a complete mold cavity of a different configuration.

The foregoing specific embodiment of the present invention as set forth in the specifications herein is for illustrative purposes only. Various deviations and modifications may be made within the spirit and space of this invention, without departing from a main theme thereof.

What is claimed is:

1. A mold comprising:
  a first mold half and
  a second mold half with said first mold half comprising:
    a first mold base;
    a first plurality of insert straps supported by said first mold base with each of said first plurality of insert straps having a portion of a desired mold cavity;
    first clamping connections disposed on said first mold base for clamping said first plurality of insert straps together to form a mold cavity; and
    a first sub-ejector assembly with said first sub-ejector assembly movably disposed on said first mold half.

2. The mold according to claim 1 further comprising:
  said second mold half comprising:
    a second mold base;
    a second plurality of insert straps supported by said second mold base with each of said second plurality of insert straps having a portion of a desired mold cavity and
    second clamping connections disposed on said second mold base for clamping said second plurality of insert straps together to form a mold cavity.

3. A mold comprising:
  a first mold half and
  a second mold half with said first mold half comprising:
    a first mold base;
    a first plurality of insert straps supported by said first mold base with each of said first plurality of insert straps having a portion of a plurality of desired mold cavities,
    first clamping connections disposed on said first mold base for clamping said first plurality of insert straps together to form a plurality of mold cavities; and
    a first sub-ejector assembly with said first sub-ejector assembly movably disposed on said first mold half.

4. The mold according to claim 3 further with the second mold half comprising:
  a second mold base;
  a second mold plurality of insert straps supported by said second mold base with each of said second plurality of insert straps having a portion of a plurality of desired mold cavities, and
  second clamping connections disposed on said second mold base for clamping said second plurality of insert straps together to form a plurality of mold cavities.

5. The mold according to claim 3 further comprising a heater disposed on said first mold half.

6. The mold according to claim 3 wherein said first sub-ejector assembly comprises:
  at least one ejector plate;
  a pair of bushings mounted on said ejector plate;
  a pair of pins disposed above said ejector plate and disposed riding one each in said bushings;
  a bump bar disposed above said pins;
  a plurality of sub-ejector plates disposed above said bump bar, and
  a plurality of ejector pins mounted on said sub-ejector plates with pressure on said ejector plate causing pressure on said pair of pins, said bump bar and said sub-ejector plates thereby causing said plurality of ejector pins to move into said mold cavities.

7. The mold according to claim 4 further comprising a second sub-ejector assembly with said second sub-ejector assembly movably disposed on said second mold half.

8. The mold according to claim 7 wherein said second sub-ejector assembly comprises:
  a second ejector plate;
  a second pair of bushings mounted on said second ejector plate;
  a second pair of pins disposed adjacent to said second ejector plate and disposed riding one each in said second pair of bushings;
  a second bump bar disposed adjacent to said second pair of pins;
  a second plurality of sub-ejector plates disposed adjacent to said second bump bar, and
  a second plurality of ejector pins mounted on said sub-ejector plates with pressure on said second ejector plate causing pressure on said second pair of pins, said second bump bar and said second plurality of sub-ejector plates thereby causing said second plurality of ejector pins to move into said mold cavities.

9. The mold according to claim 3 wherein said clamping connections comprises a plurality of screws.

10. The mold according to claim 3 wherein said plurality of insert straps comprises:
  a plurality of generally elongated members.

11. The mold according to claim 8 wherein said bump bar comprises:
  a generally elongated member with said bump bar generally disposed perpendicular relative to said plurality of insert strap members and wherein said plurality of insert strap members and said bump bar are disposed forming a pair of generally parallel planes.

* * * * *